United States Patent [19]

Hashimoto et al.

[11] Patent Number: 5,393,262

[45] Date of Patent: Feb. 28, 1995

[54] AIR-CONDITIONING BLOW-OUT PORT DEVICE AND PROCESS FOR TWO-STAGE INJECTION MOLDING OF THE SAME

[75] Inventors: Kazuhiro Hashimoto, Kawagoe; Katsumi Nakagawa, Ise, both of Japan

[73] Assignees: Moriroku Kabushiki Kaisha, Tokyo; Ise Kanagata Kogyo Kabushiki Kaisha, Ise, both of Japan

[21] Appl. No.: 62,837

[22] Filed: May 18, 1993

[30] Foreign Application Priority Data

Dec. 1, 1992 [JP] Japan ................................. 4-321960

[51] Int. Cl.$^6$ ............................................. B60H 1/34
[52] U.S. Cl. ................................... 454/155; 454/315; 454/319; 454/320
[58] Field of Search ............... 454/109, 155, 313, 315, 454/318, 319, 320

[56] References Cited

U.S. PATENT DOCUMENTS 3,680,470  8/1972  Neece .................................. 454/313
4,009,648  3/1977  Braden et al. .

FOREIGN PATENT DOCUMENTS 18011    1/1984  Japan .................................. 454/155
128059   6/1986  Japan .................................. 454/155
191414   8/1986  Japan .................................. 454/155

*Primary Examiner*—Harold Joyce
*Attorney, Agent, or Firm*—Armstrong, Westerman, Hattori, McLeland & Naughton

[57] ABSTRACT

An air-conditioning blow-out port device includes a housing of synthetic resin; a plurality of blades of synthetic resin each having a blade body disposed within the housing pairs of shaft bores provided in a coaxial arrangement in each pair in opposed portions of a peripheral wall of the housing; a pair of support shafts projectingly provided on opposite ends of the blade body and rotatably fitted in the shaft bores. A pivotal mounting portion is provided on each of the blades, and an interlocking link interlockingly connects the pivotal mounting portions of the blades. The pivotal mounting portion is comprised of a pivotal supporting shaft which is projectingly provided in parallel to the support shaft at an end of each blade body to extend through a pivotal supporting bore in the interlocking link, and a slip-off preventing projection provided at a tip end of the pivotal supporting shaft to engage an edge of the pivotal supporting bore. Thus, the pivotal mounting portion can be provided within an extent of thickness of the blade to provide a reduced spacing between the blades.

1 Claim, 15 Drawing Sheets

AIR-CONDITIONING BLOW-OUT PORT DEVICE AND PROCESS FOR TWO-STAGE INJECTION MOLDING OF THE SAME

BACKGROUND OF THE INVENTION

1. Field of the Invention

The present invention relates to an improvement in air-conditioning blow-out port device mounted in an instrument panel or the like in an automobile, and more particularly, to an improvement in air-conditioning blow-out port device comprising a housing of synthetic resin, a plurality of blades of synthetic resin each having a blade body disposed within the housing, pairs of shaft bores provided in a coaxial arrangement in each pair in opposed portions of a peripheral wall of the housing, and a pair of support shafts projectingly provided on opposite ends of the blade body a pivotal mounting portion provided on and rotatably fitted in the shaft bores, each of the blades, and an interlocking link for interlockingly connecting the pivotal mounting portions of the blades.

2. Description of the Prior Art

The pivotal mounting portion in the conventional device of this type is comprised of a pair of projecting pieces which are mounted in an opposed relation to each other on one flat surface of the blade body, and a pivotal supporting shaft spanned between both the projecting pieces. A C-shaped pivotally supporting portion of the interlocking link is engaged with the pivotal supporting shaft with an elastic force.

The above prior art device is produced by a two-stage injection molding process which comprises forming a housing at a primary injection step, and forming the blades at a second injection step by using the shaft bores in the housing as support shaft-forming cavities.

If the pivotal mounting portion is constructed in the above manner, the projecting pieces are located between the opposed surfaces of the adjacent blades. Therefore, the more spacing between the blades is required in accordance with the projection height of the projecting piece. However, the space area of the blow-out port in the housing is spontaneously limited in order to suit the surrounding appearance, thereby bringing about a reduction in number of blades mounted in the blowout port. As a result, it is failed to adjust the direction of blow-out wind is expected. Another problem is that, in some turned angle of the blade, the pivotal mounting portion is seen through the blow-out part protruded from one surface of the blade. This deteriorates the appearance.

Moreover, even with respect to the execution of the two-stage injection molding process, there is encountered a problem that the structure of opening/closing dies is complicated in correspondence to the pivotal mounting portion of the above-described construction, resulting in an increased cost of the opening/closing dies and in its turn, bringing about an increase in cost of manufacture of the above-described device.

SUMMARY OF THE INVENTION

Accordingly, it is an object of the present invention to provide an air-conditioning blow-out port device of the above-described type, wherein the pivotal mounting portion can be provided within an extent of thickness of the blade, thereby providing a reduced spacing between the blades and an improved appearance.

To achieve the above object, according to the present invention, there is provided an air-conditioning blow-out port device comprising a housing of synthetic resin a plurality of blades of synthetic resin each having a blade body disposed within the housing, pairs of shaft bores provided in a coaxial arrangement in each pair in opposed portions of a peripheral wall of the housing, a pair of support shafts projectingly provided on opposite ends of the blade body and rotatably fitted in the shaft bores, a pivotal mounting portion provided on each of the blades and an interlocking link for interlockingly connecting the pivotal mounting portions of the blades, wherein the pivotal mounting portion is comprised of a pivotal supporting shaft which is projectingly provided in parallel to the support shaft at an end of each blade body to extend through a pivotal supporting bore in the interlocking link, and a slip-off preventing projection provided at a tip end of the pivotal supporting shaft to engage an edge of the pivotal supporting bore.

With the above device, the pivotal mounting portion, i.e., the pivotal supporting shaft and the slip-off preventing projection can be located within an extent of thickness of each blade, thereby enabling the reduction in spacing between the blades. Therefore, it is possible to increase the number of blades mounted, thereby effectively adjusting the direction of blow-out wind. In addition, the pivotal mounting portion does not protrude from surfaces of the blade as viewed at any turned angle of the blade, leading to a good outward appearance.

It is another object of the present invention to provide a process for two-stage injection molding of an air-conditioning blow-out port device of the above-described type, wherein the structure of opening/closing dies can be simplified in correspondence to the structure of the pivotally mounting portion, thereby enabling the mass production of the device at a reduced cost.

To achieve the above object, according to the present invention, there is provided a process for two-stage injection molding of an air-conditioning blow-out port device, said device comprising a housing of synthetic resin, a plurality of blades of synthetic resin having a blade body disposed within the housing, pairs of shaft bores provided in a coaxial arrangement in each pair in opposed portions of a peripheral wall of the housing to extend through the opposed portions, a pair of support shafts projectingly provided on opposite ends of the blade body and rotatably fitted in the shaft bores, a pivotal mounting portion provided on each of the blades, and an interlocking link for operatively connecting the pivotal mounting portions of the blades, the pivotal mounting portion being comprised of a pivotal supporting shaft which is projectingly provided in parallel to the support shaft at an end of each blade body to extend through a pivotal supporting bore in the interlocking link, and a slip-off preventing projection provided at a tip end of the pivotal supporting shaft to engage an edge of the pivotal supporting bore, the process comprising the steps of: closing a pair of opposed primary opening/closing dies for a housing-forming to clamp between the primary opening/closing dies a plurality of first opposed slide dies including a plurality of shaft bore forming cores, thereby defining a cavity for forming the housing in cooperation with the shaft bore forming cores; primarily injecting synthetic resin into the cavity to mold the housing; closing a pair of opposed secondary opening/closing dies for a blade-forming, thereby clamping the molded housing between the secondary opening-closing dies and a second slide die clamped between both the secondary opening/closing dies and defining a plurality of blade body-forming cavities, while defining a plurality of pivotal supporting shaft-forming cavities between one of the secondary opening/closing dies and the second slide die, said pivotal supporting shaft forming cavities communicating with a plurality of slip-off preventing projection-forming cavities provided in the one of the secondary opening/closing dies; and using the shaft bores in the molded housing as support shaft-forming cavities and secondarily injecting synthetic resin into the blade body-forming cavities, the support shaft forming cavities, the pivotal supporting shaft forming cavities and the slip-off preventing projection-forming cavities to mold the blades.

With the above two-stage injection molding process, the structure of the opening/closing dies can be simplified in correspondence to the structure of the pivotal mounting portion. This enables the mass production of the air-conditioning blow-out port device at a reduced cost.

The above and other objects, features and advantages of the invention will become apparent from a consideration of the following description of the preferred embodiments, taken in conjunction with the accompanying drawings.

DESCRIPTION OF THE PREFERRED EMBODIMENTS

Figure 1:
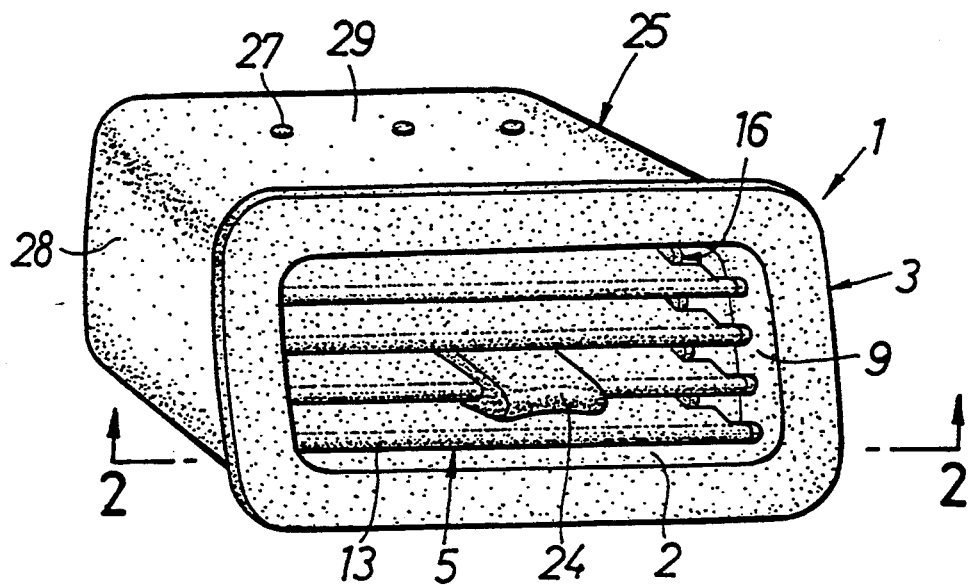
FIG. 1 is a perspective view illustrating one example of an air-conditioning blow-out port device.
Figure 2:
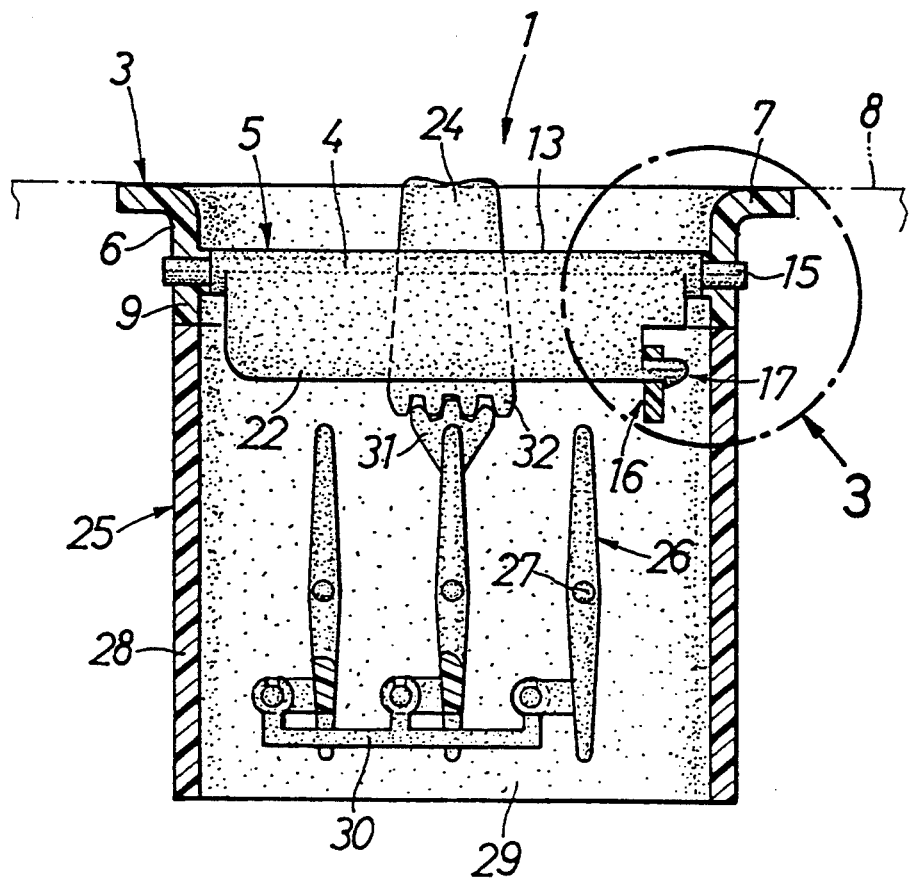
FIG. 2 is a sectional view taken along a line 2—2 in FIG. 1.

FIGS. 1 to 5 illustrate one example of an air-conditioning blow-out port device 1. As best shown in FIGS. 1 and 2, this device 1 is comprised of a housing 3 of synthetic resin having a substantially rectangular blow-out port 2, and a plurality of blades 5 of synthetic resin having blade bodies 4 disposed within the housing 3 for adjusting the vertical direction of blow-out. The housing 3 has a front flange 7 at a front end of a peripheral wall 6 thereof and is adapted to be embedded into an instrument panel 8 of an automobile with a front surface of the front flange 7 being aligned with a surface of the instrument panel 8.

Figure 3:
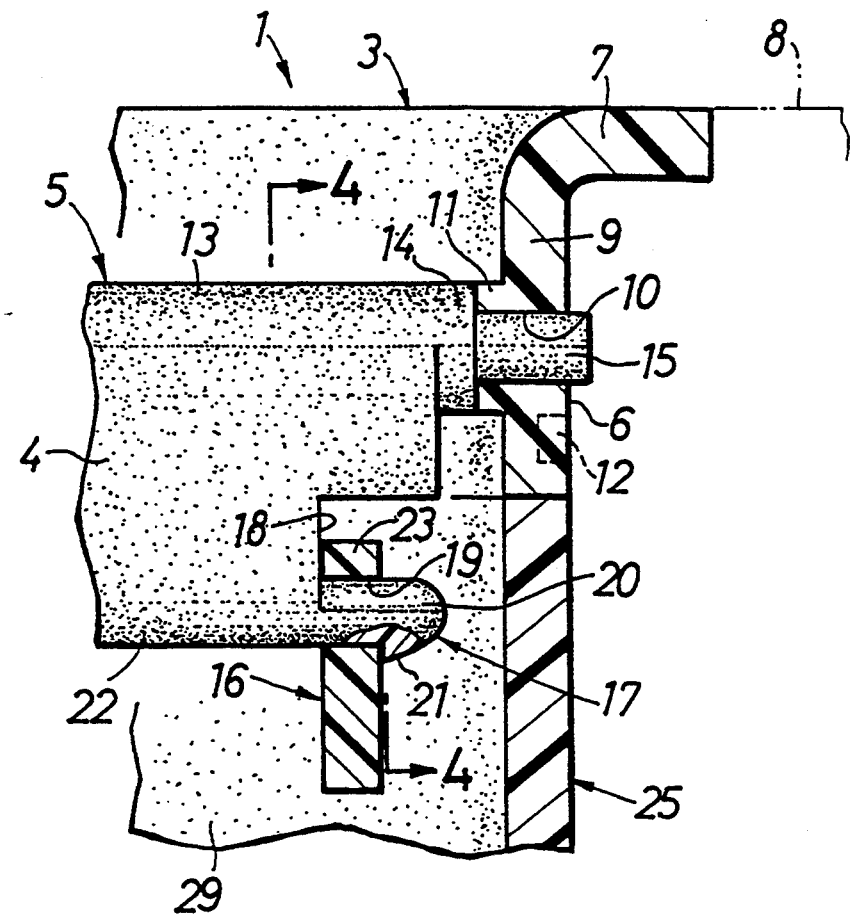
FIG. 3 is an enlarged view taken along an arrow 3 in FIG. 2.
Figure 4:
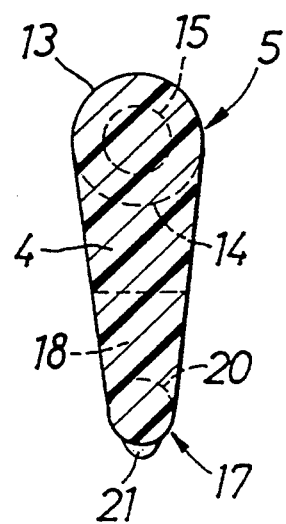
FIG. 4 is a sectional view taken along a line 4—4 in FIG. 3.

As best shown in FIGS. 2 and 3, the peripheral wall 6 of the housing 3 is provided, at left and right opposed wall portions 9 thereof, with pairs of shaft bores 10 arranged coaxially in each pair to extend through the opposed wall portions 9, and pairs of circular-section bosses 11 located coaxially with corresponding one of the shaft bores 10 to define an opening of the shaft bore 10 inside the opposed wall portion 9. Recesses 12 are opened at outer surfaces of the opposed wall portions 9. The recesses 12 were used during a step of releasing the device 1 from a molding apparatus.

Each of the blades 5 is provided, at a front edge 13 of the blade body 4, with a pair of protruding portions 14 abutting against the pair of bosses 11. The protruding portion 14 having the same diameter as the bosses 11. A pair of support shafts 15 are projectingly provided coaxially on end faces of the protruding portions 14 and turnably fitted in the shaft bores 10, respectively. The front edge 13 of the blade body 4 is formed to have the same curvature as the protruding portion 14, as clearly shown in FIG. 4, whereby the front edge 13 is continuous with the protruding portions 14 with no step therebetween.

If the mounting structure for each blade 5 is constructed in the above manner, even if each blade 5 is turned to any adjusted position direction-adjusted position, each protruding portion 14 and each boss 11 cannot be offset from each other and therefore, the appearance of the mounting structure can be improved.

Figure 5:
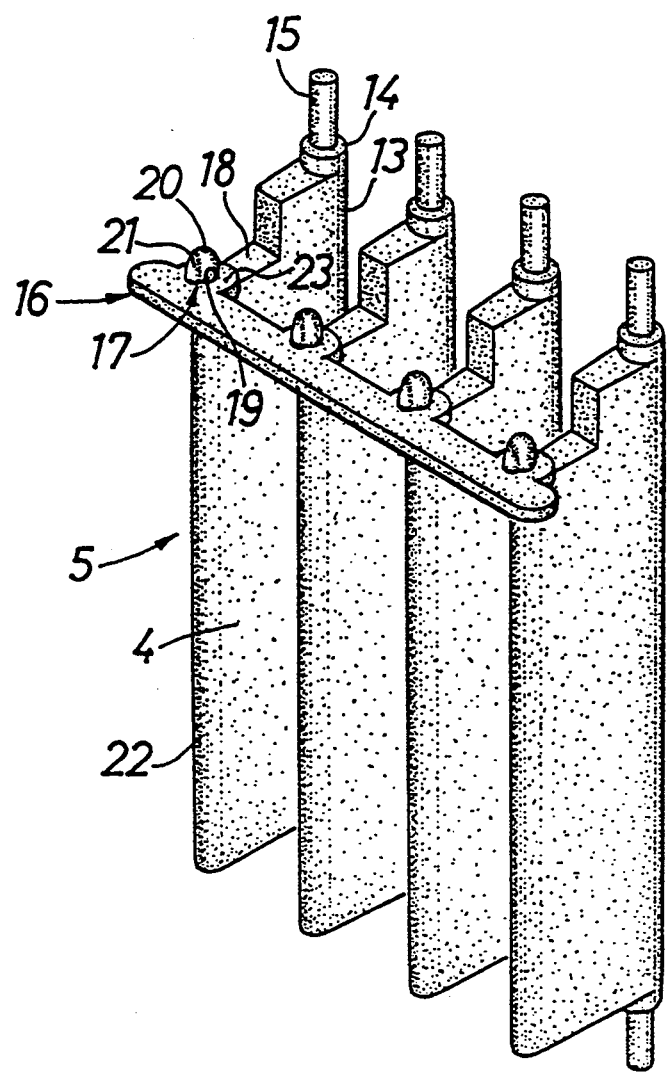
FIG. 5 is a perspective view illustrating the relation between blades and an interlocking link.

The blades 5 are adapted to turn interlockingly with one another and to this end, each blade 5 has a pivotal mounting portion 17 for an interlocking link 16. As best shown in FIGS. 3 and 5, the pivotal mounting portion 17 is comprised of a pivotal supporting shaft 20 projectingly provided on a notch-like end 18 of each blade body 4 in parallel to the support shaft 15 to extend through a pivotal supporting bore 19 in the interlocking link 16, and a slip-off preventing projection 21 provided at the tip end of the pivotal supporting shaft 20 to engage an edge of the pivotal supporting bore 19. The slip-off preventing projection 21 is raised outwardly from a rear edge of the blade body 4 and is forcedly protruded through the pivotal supporting bore 19 in the interlocking link 16 by utilizing the elastic property of an annular portion 23 of the interlocking link 16. As best shown in FIGS. 1 and 2, an operating knob 24 is slidably mounted to one of the blades 5 for sliding movement in a longitudinal direction of the blade body 4. Thus, if the operating knob 24 is swung vertically, the blades 5 are turned upwardly or downwardly through the interlocking link 16.

With the above-described construction, the pivotal mounting portion 17, i.e., the pivotal supporting shaft 20 and the slip-off preventing projection 21 can be located within a range of the thickness of each blade 5, thereby enabling the reduction in the spacing between the blades. This contributes to increasing the number of the blades 5, so that the direction of blow out wind can be adjusted as expected. The pivotal mounting portion 17 does not protrude from surfaces of the blade 5 as viewed at any angled position of the blade 5, leading to a good appearance.

Referring to FIGS. 1 and 2, another housing 25 of synthetic resin is bonded to a rear end of the housing 3, and a plurality of blades 26 of synthetic resin for adjusting the lateral direction of blow out wind are mounted within the housing 25. Support shafts 27 are mounted at opposite ends of each of the blades 26, respectively, and are rotatably supported respectively on upper and lower opposed wall portions 29 which constitute a peripheral wall 28 of the housing 25, and an interlocking link 30 is pivotally supported on the blades 26. A toothed portion 31 is formed on the middle one of the blades 26 and meshed with a toothed portion 32 of the operating knob 24. Thus, if the operating knob 24 is slid in a lateral direction along the blade body 4, the blades 26 are turned to change the direction of blow out wind to the right or left.

A two-stage injection molding process for producing the above-described air-conditioning blow-out device 1 will now be described. In this molding process, a procedure is employed which comprises molding the housing 3 at a primary injection step, and molding the blades 5 at a secondary injection step by use of the shaft bores 10 in the molded housing 3 as support shaft-forming cavities.

FIGS. 6 to 11 illustrate a primary injection molding apparatus 33 used at the primary injection step for molding the housing 3. The apparatus 33 comprises a movable first opening/closing die 34, a stationary second stationary opening/closing die 35 opposed to the first opening/closing die 34, and a plurality (e.g., a pair in the illustrated embodiment) of first slide dies 36 adapted to be clamped between the opening/closing dies 34 and 35. The first slide dies 36 each comprises a plurality of shaft bore-forming cores 37, and a plurality of protrusions 38 each arranged by the side of each core 37. The first slide dies 36 are slidably mounted in an opposed relation to each other on the second opening/closing die 35.

First step

Figure 6:
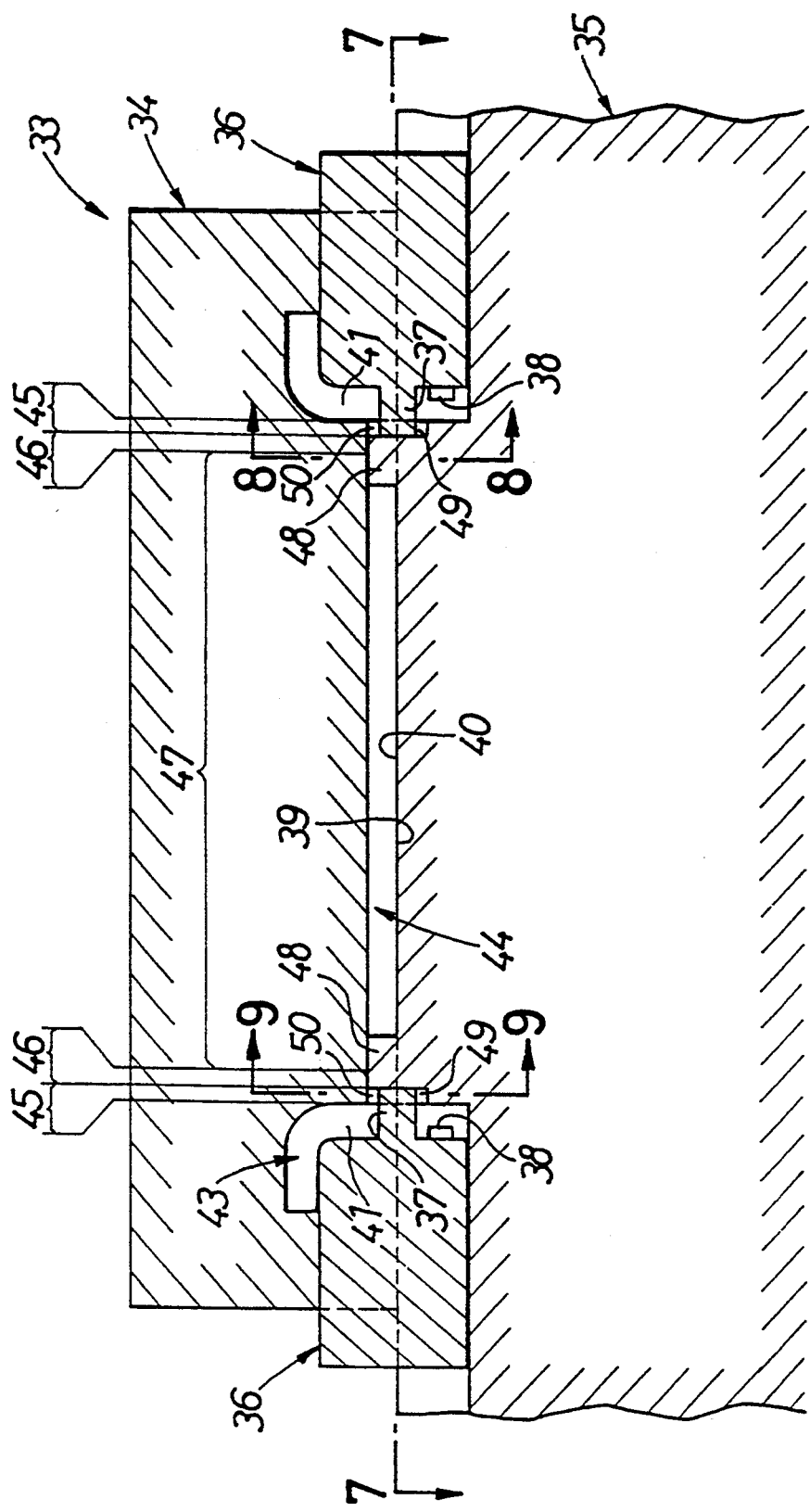
FIG. 6 is a longitudinal sectional view illustrating one example of a primary injection molding apparatus and corresponding to a sectional view taken along a line 6—6 in FIG. 7.
Figure 7:
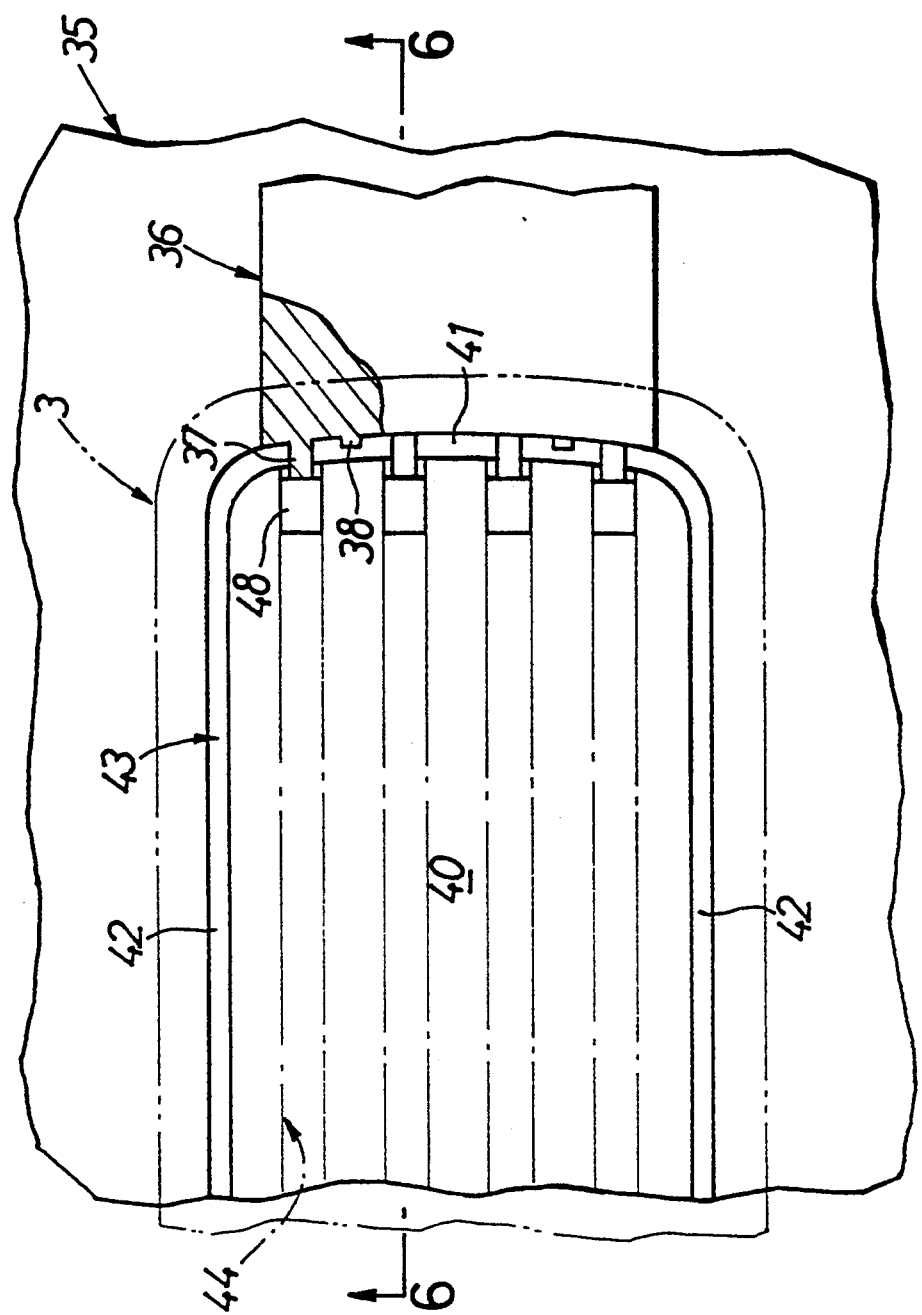
FIG. 7 is a view taken along a line 7—7 in FIG. 6.

As is shown in FIGS. 6 and 7, the first opening/closing die 34 is lowered, and the opening/closing dies 34 and 35 are closed, and the first slide dies 36 are clamped between the opening/closing dies 34 and 35.

This causes an axis of each shaft bore-forming core 37 of the first slide die 36 to be aligned with superposed surfaces 39 and 40 of the opening/closing dies 34 and 35, thereby defining a pair of spaces 41 corresponding to the pair of opposed wall portions of the housing (which will be referred to as opposed wall portion-corresponding spaces hereinafter) and including the cores 37 and the protrusions 38, and a pair of areas 42 corresponding to the pair of another opposed wall portions of the housing and substantially perpendicular to the spaces 41. Both the spaces 41 and 42 constitute a first cavity 43 for forming the peripheral wall 6 and the flange 7 of the housing 3.

The opening/closing die 34 has a plurality of semicircular section recesses 44 opened at the superposed surface 39 thereof with opposite ends communicating with the first cavity 43. A bottom surface at each of opposite ends of each first recess 44 is an area 45 for forming the boss 11 of the housing (which will be referred to as boss-corresponding area hereinafter). A bottom surface at a location inside each of the boss-corresponding areas 45 is a protruding portion-corresponding area 46 and used to form a half of the protruding portion 14 of each blade 5 at a secondary injection step. Further, there is a front edge-corresponding area 47 which is bottom surface extending between the boss-corresponding areas 46 and used to form the front edge 13 of each blade 13 at the secondary injection step.

Figure 8:
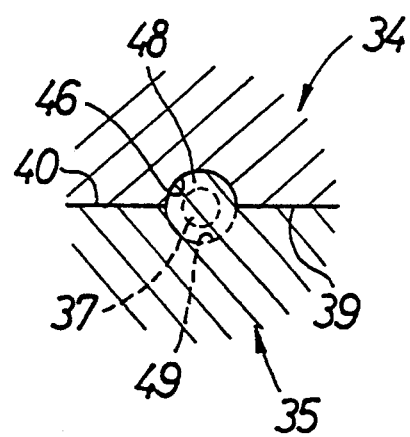
FIG. 8 is a sectional view taken along a line 8—8 in FIG. 6.

As is shown in FIGS. 6, 7 and 8, a plurality (e.g., a pair per first recess 44 in the illustrated embodiment) of semi-circular section dam projections 48 projectingly provided on the superposed surface 40 of the second opening/closing die 35 are each received by the protruding portion-corresponding area 46 in the first recesses 44 simultaneously with the formation of the first cavity 43, respectively.

Figure 9:
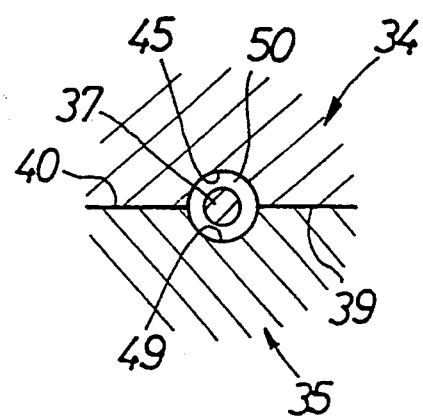
FIG. 9 is a sectional view taken along a line 9—9 in FIG. 6.

As a result, a plurality of second cavities 50 for forming the bosses 11 are defined around tip ends of the shaft bore-forming cores 37 which abut against side faces of the dam projections 48, as shown in FIGS. 6, 7 and 9, by cooperation of a pair of semi-circular section recesses 49 opened at the superposed surface 40 of the second opening/closing die 35 and the boss-corresponding area 45 of each first recess 44. Each of the second cavities 50 communicates with the first cavity 43, but is disconnected from the front edge-corresponding area 47 of each first recess 44 by the dam projections 48.

Second step

Figure 10:
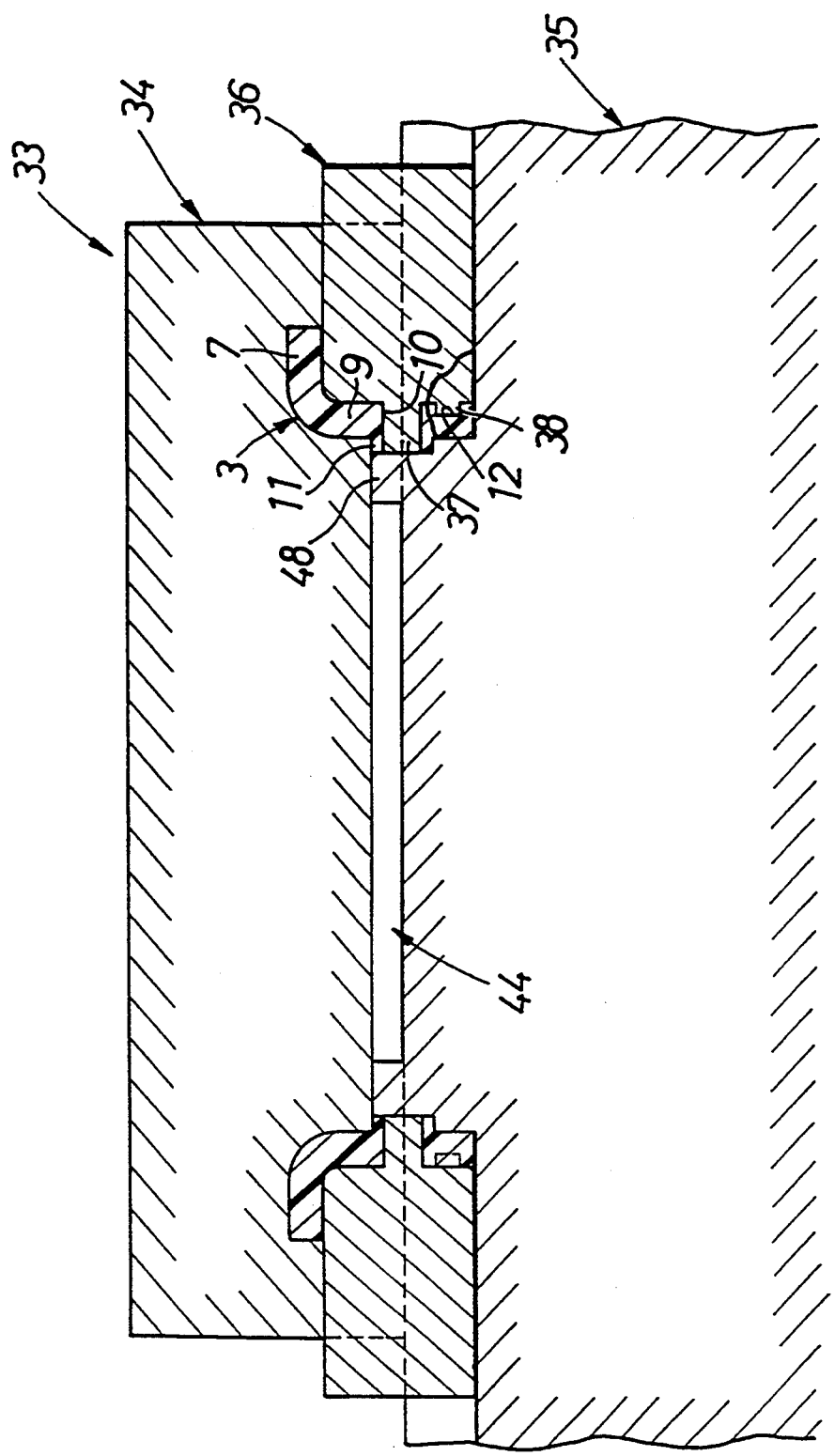
FIG. 10 is a longitudinal sectional view of the primary injection molding apparatus with a molded housing.

As is shown in FIG. 10, a polyethylene (PP)-based resin as a synthetic resin is primarily injected through a gate (not shown) into the first cavity 43 and the second cavities 50 to mold the housing 3. The plurality of recesses 12 are formed in the outer surfaces of the opposed wall portions 9 of the housing 3 by the protrusions 38 for use at the releasing step. In this case, the boss 11 is formed distinctly, because the protruding portion-corresponding area 46 of each first recess 44 is covered by the dam projection 48.

Third step

Figure 11:
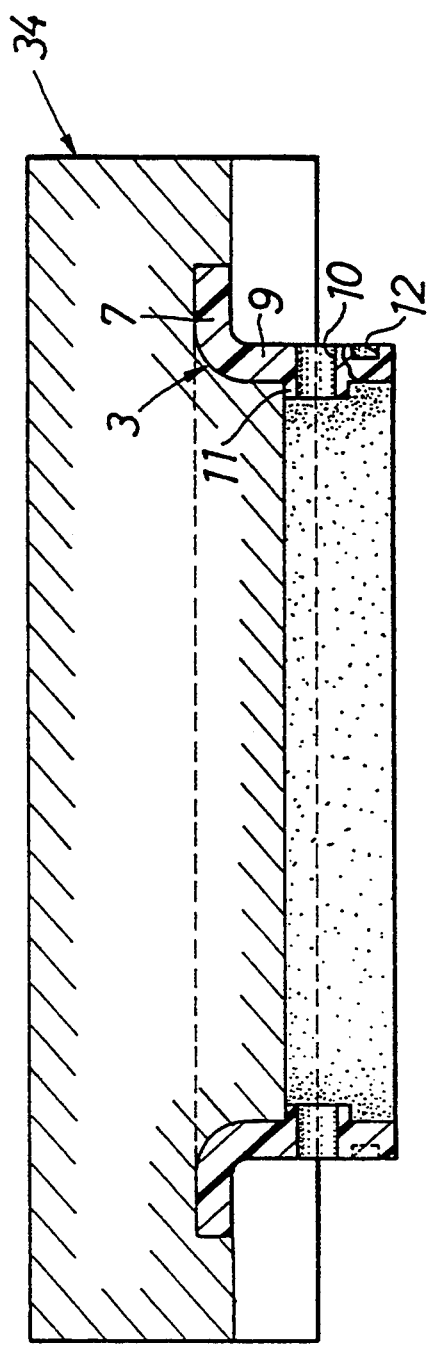
FIG. 11 is a longitudinal sectional view of a first opening/closing die with the housing attached thereto.

Both the first slide dies 36 are retreated, so that the shaft bore-shaping cores 37 are removed out of the corresponding shaft bores 10 of the molding housing. Then, the first opening/closing die 34 is lifted, so that both the opening/closing dies 34 and 35 are opened with the housing 3 left attached to the first opening/closing die 34, as shown in FIG. 11.

The molding of the housing 3 is completed via the above-described steps.

FIGS. 12 to 17 illustrate a secondary injection mounding apparatus 51 used at the secondary injection step for molding the blades 5. The apparatus 51 comprises the first movable opening/closing die 34 commonly used in the primary injection molding apparatus 33, a stationary third opening/closing die 52 opposed to the first movable opening/closing die 34, and a plurality (e.g., a pair in the illustrated embodiment) of second slide dies 53 and 54 adapted to be clamped between the opening/closing dies 34 and 52. The second slide dies 53 and 54 are slidably mounted in an opposed relation to each other on the third opening/closing die 52 and each includes a plurality of protrusions 55 corresponding to the plurality of recesses 12 opened in the outer surface of each of the opposed wall portions 9 of the housing 3, and a plurality of recesses 56 adapted to form the support shaft 15 in order to protrude the tip ends thereof from the outer surface of each of the opposed wall portions 9.

One of the second slide dies 54 has a plurality of forming-projections 57 for forming the notch-like end 18 of each blade 5.

Fourth step

As is shown in FIGS. 12 to 15, the first opening/closing die 34 is lowered, so that the opening/closing dies 34 and 52 are closed, and the pair of second slide dies 53 and 54 are clamped between the opening/closing dies 34 and 52.

Figure 12:
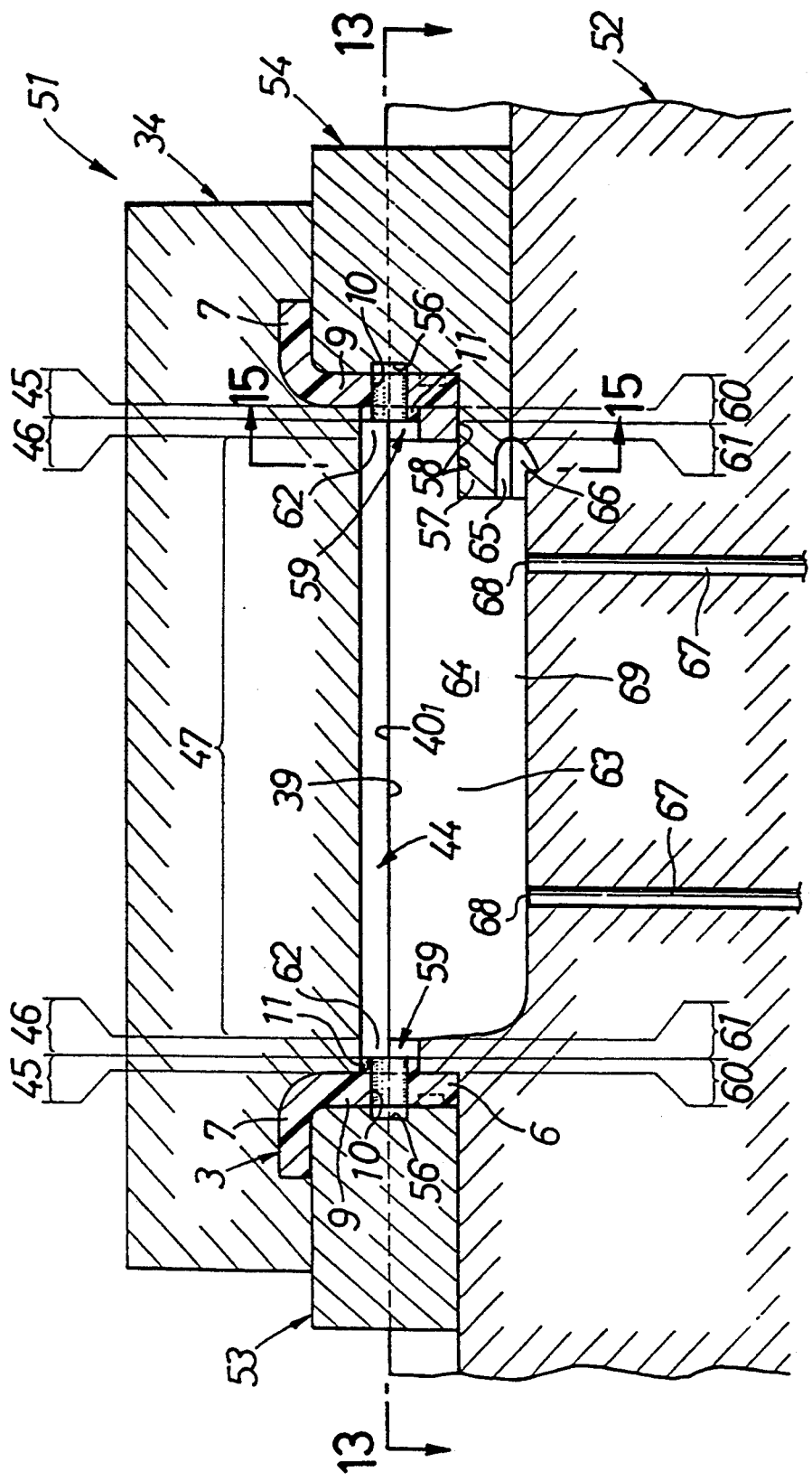
FIG. 12 is a longitudinal sectional view illustrating one example of a secondary injection molding apparatus and corresponding to a sectional view taken along a line 12—12 in FIG. 13.
Figure 13:
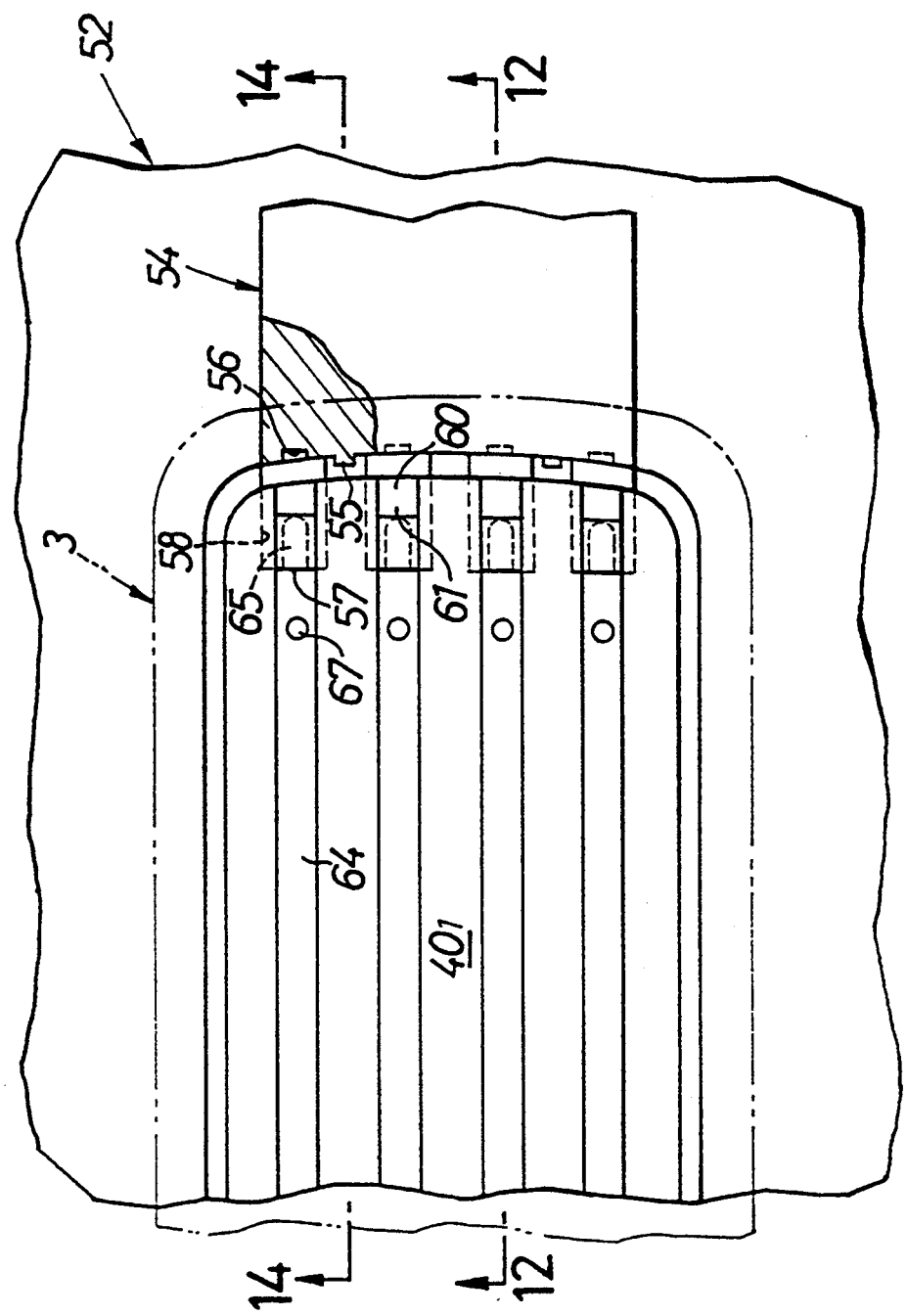
FIG. 13 is a view taken along a line 13—13 in FIG. 12.
Figure 14:
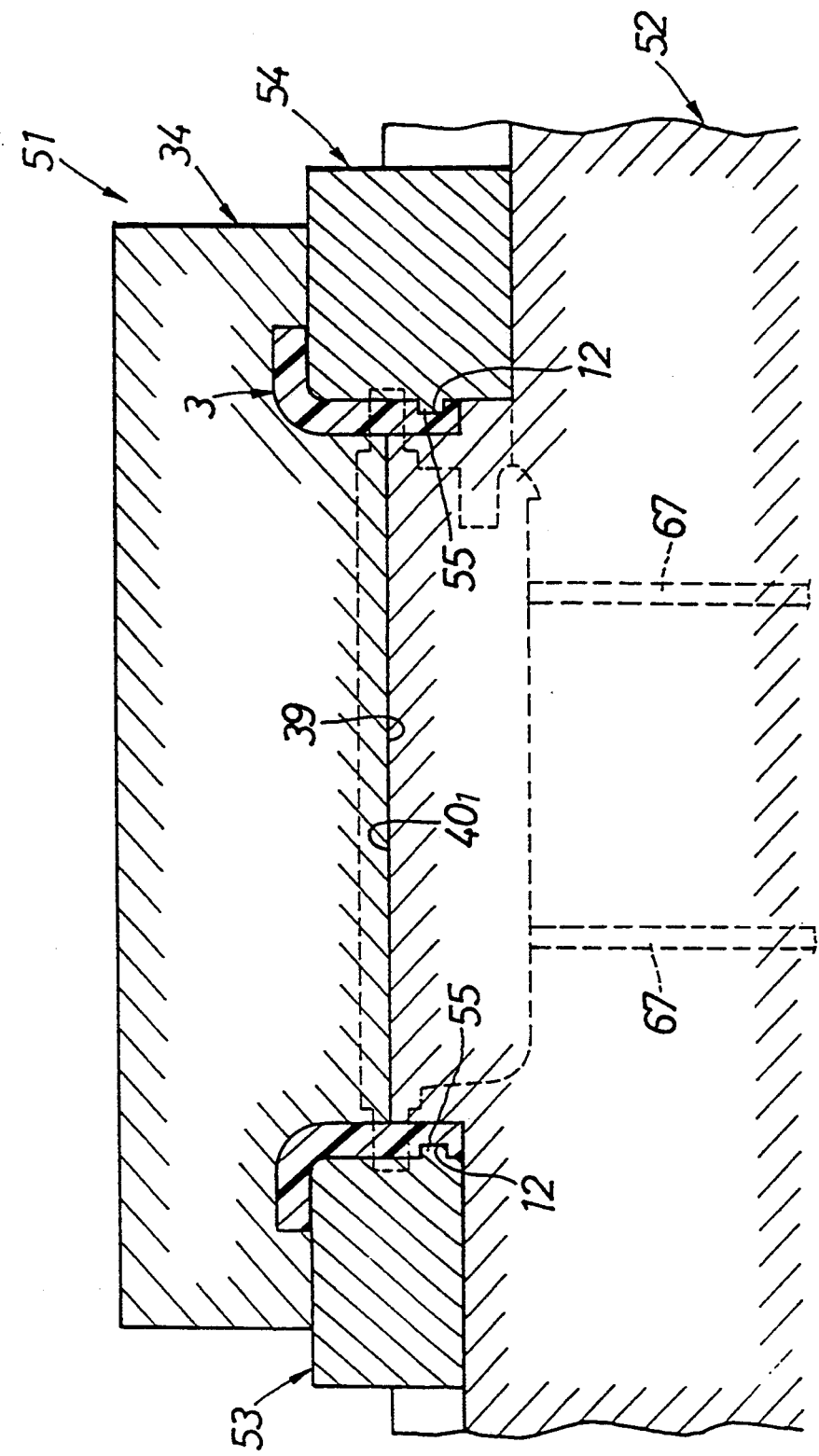
FIG. 14 is a longitudinal sectional view illustrating another example of the secondary injection molding apparatus and corresponding to a sectional view taken along a line 14—14 in FIG. 13.
Figure 15:
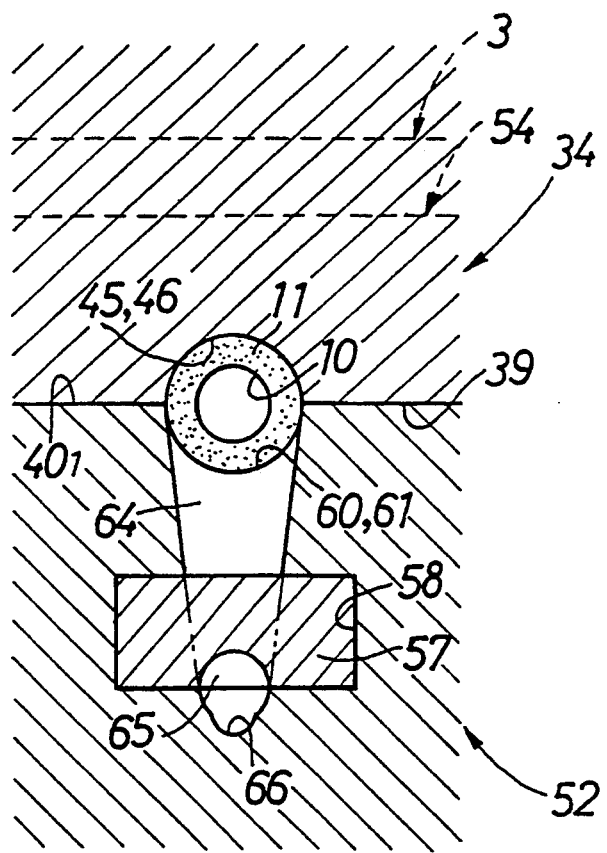
FIG. 15 is a sectional view taken along a line 15—15 in FIG. 12.

Thus, the peripheral wall 6 and the front flange 7 of the housing 3 are clamped between the opening/closing dies 34 and 52 and the second slide dies 53 and 54, so that the protrusions 55 of each of the second slide dies 53 and 54 are fitted into the recesses 12 of the housing 3, respectively. And the recesses 56 are disposed coaxially with the shaft bores 10 in the housing 3, respectively, as best shown in FIG. 14. Further, as best shown in FIGS. 12 and 15, the forming portions 57 of the one second slide die 54 are passed through slide bores 58 in the third opening/closing die 52, respectively.

The third opening/closing die 52 has a plurality of second recesses 59 having a semi-circular section and opposed to the first recesses 44 in the first opening/closing die 34, respectively, so that the bosses 11 are clamped between boss-corresponding areas 45 and 60 of the first and second recesses 44 and 59, respectively. A third cavity 62 for forming the protruding portion 14 is defined between each of the protruding portion-corresponding areas 46 of the first recesses 44 and each of protruding portion-corresponding areas 61 of the second recesses 59. The third cavities 62 communicate with the shaft bores 10 and are disposed coaxially with the shaft bores 10 and the bosses 11, respectively.

Further, a fourth cavity 64 for forming the blade body 4 is defined between the front edge-corresponding area 47 of each of the first recess 44 in the first opening-closing die 34 and each of deep recesses 63 which are opened in a superposed surface 40₁ between the two second recesses 59 of the third opening/closing die 52. The fourth cavities 64 communicates with the third cavities 62, respectively. Each of the shaft bores 10 in the housing 3 functions as a fifth cavity for forming the support shaft 15.

A sixth cavity 65 for forming the pivotal supporting portion 20 is defined between each of the forming portions 57 of the one second slide die 54 and the slide surface of the third opening/closing die 52. A seventh cavity 66 for forming the slip-off preventing projection 21 is defined in the third opening/closing die 52 and opened into each of the sixth cavities 65. In this way, the structure of each of the sixth and seventh cavities 65 and 66 is simplified in correspondence to the structure of the pivotal mounting portion 17.

The third opening/closing die 52 is provided with a plurality of the pins 67. Abutment faces 68 of each pair of ejector pins 67 are exposed to rear edge-corresponding space 69 which forms the rear edge 22 of the blade body 4.

Fifth step

Figure 16:
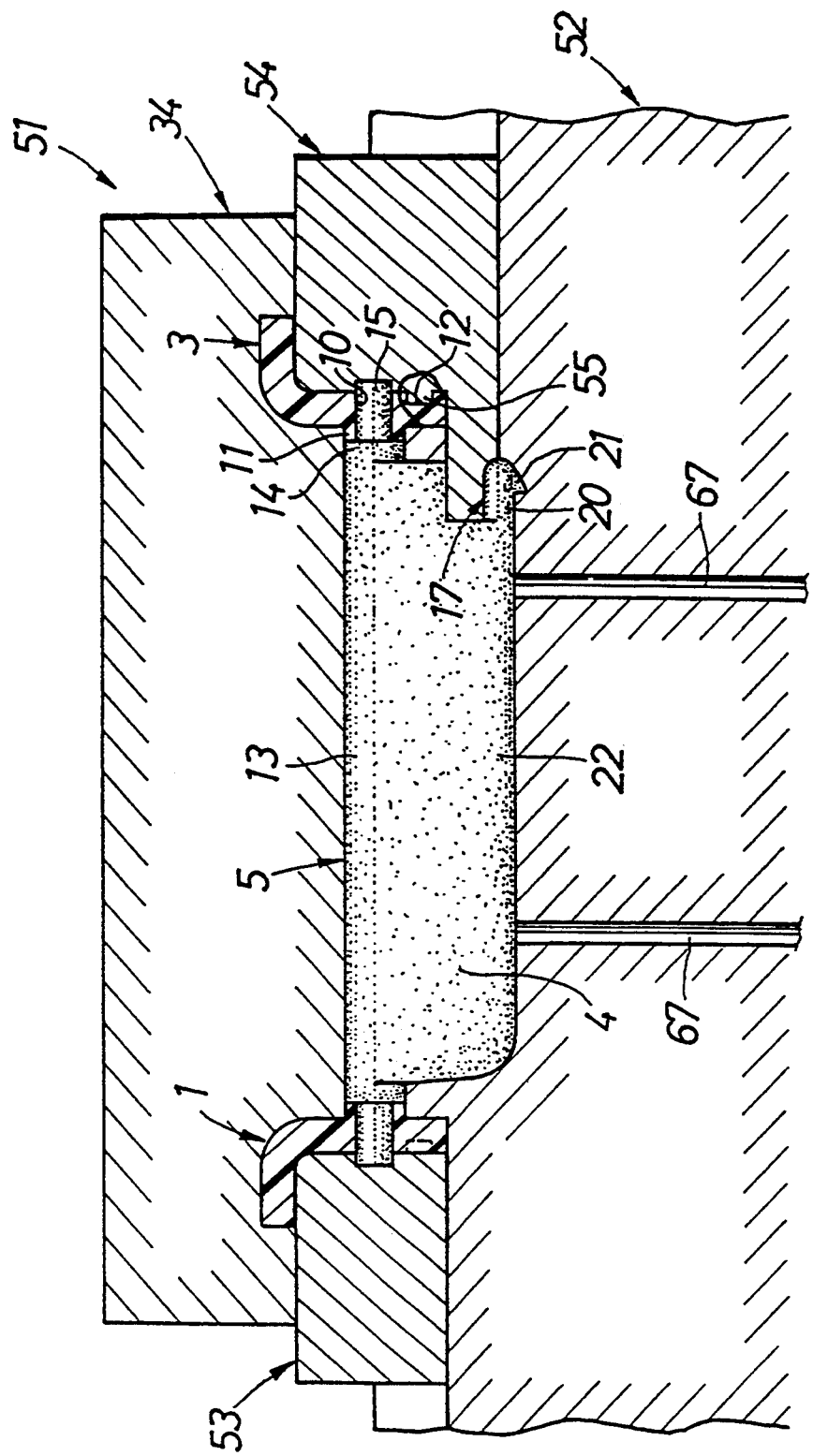
FIG. 16 is a longitudinal sectional view of the secondary injection molding apparatus with a molded blow-out port device.
Figure 17:
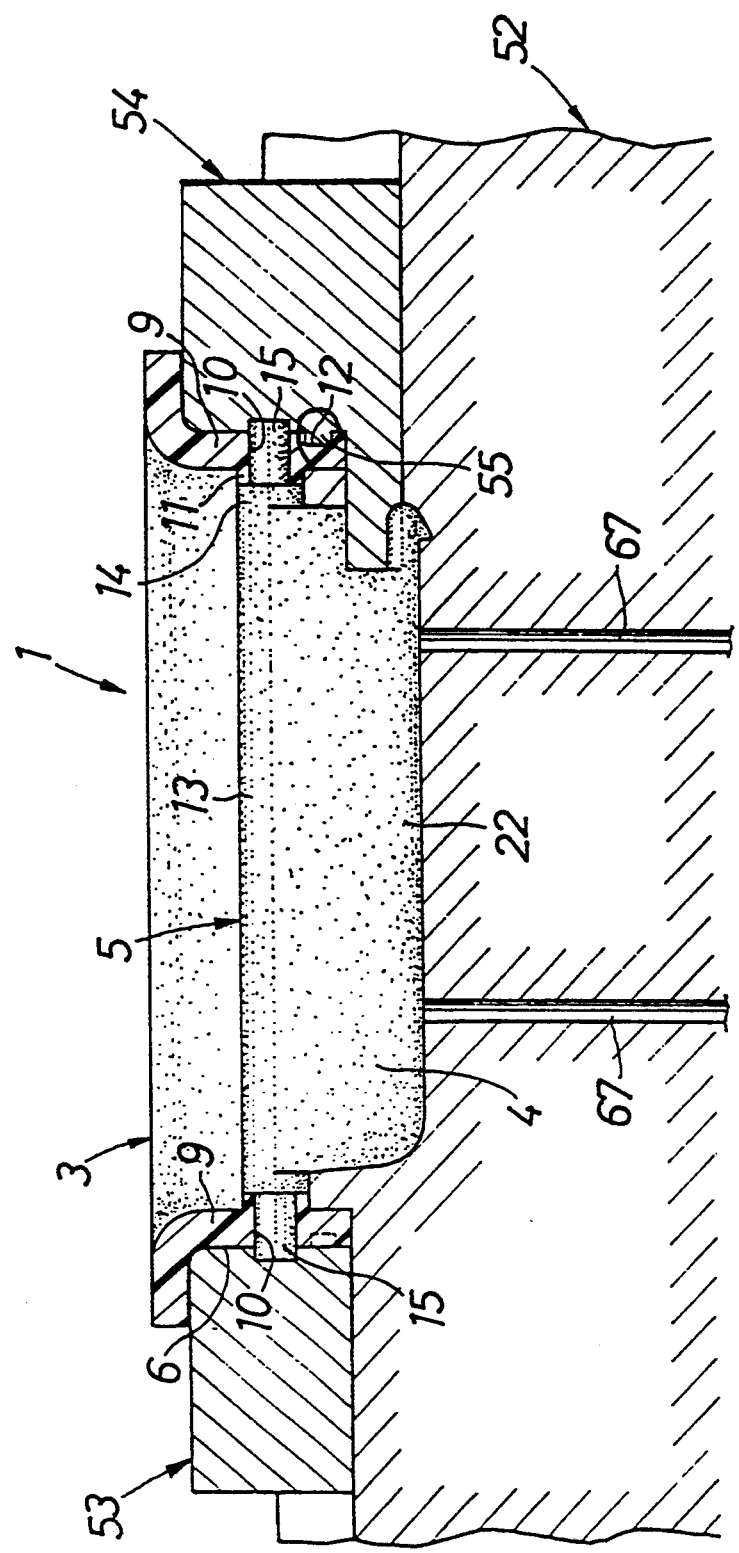
FIG. 17 is a longitudinal sectional view of the secondary injection molding apparatus with the blow-out port device remaining on a third opening/closing die.

As is shown in FIG. 16, a polybutylene terephthalate (PBT) based resin as a synthetic resin is secondarily injected through a gate (not shown) into the third to seventh cavities 62, 64, 10, 65 and 66 to mold blades 5, thereby providing a blow-out port device 1.

In this case, the protruding portions 14 are formed coaxially with the bosses 11, respectively, because the third cavities 62 for forming the protruding portions of the blades 5 are arranged coaxially with the bosses 11, respectively.

In addition, because the primary and secondary injection steps are carried out by common use of the opening/closing die 34, the cost of the opening/closing dies can be reduced, and the cost and working time required to replace the die can be omitted to improve the mass productivity of the blow-out port device.

Sixth step

The first opening/closing die 34 is lifted to open both the opening/closing dies 34 and 52. The blow-out device 1 remains on the third opening/closing die 52 by fitting engagement of the recesses 12 in the housing 3 with the protrusions 55 of the second slide dies 53 and 54, respectively.

Then, the second slide dies 53 and 53 are retreated, so that the protrusions 55 thereof are separated from the corresponding recesses 12 of the housing 3, and the recesses 56 are separated from the corresponding tip ends of the support shafts 15, respectively. Then, the ejector pins 67 are brought into abutment against the rear edges 22 of the blade bodies 4 to eject the blow-out port device 1 from the third opening/closing die 52.

When the device is intended to be from the die in this manner, the blades 5 are ejected by the ejector pins 67 and hence, a force supporting the housing 3 is only applied to each of the support shafts 15, and the force of this degree does not damage each of the support shafts. In addition, because an ejecting force is applied directly to each of the blades 5 which are tightly contacted with the forming surface, the releasability of each blades 5 is good and therefore, the blade 5 cannot be damaged.

Further, the appearance of the blow-out port device 1 cannot be injured from the view point that each of the recesses 12 in the housing 3 is located in the outer surface of each of the opposed wall portions 9 and that these opposed wall portions 9 are disposed within the instrument panel 8. Further, an ejector pin abutment portion of each of the blades 5 is established at the rear edge 22 of the blade 5 which is not visible from the front of the device 1 and therefore, the appearance of the blow-out port device cannot be injured likewise.

Figure 18:
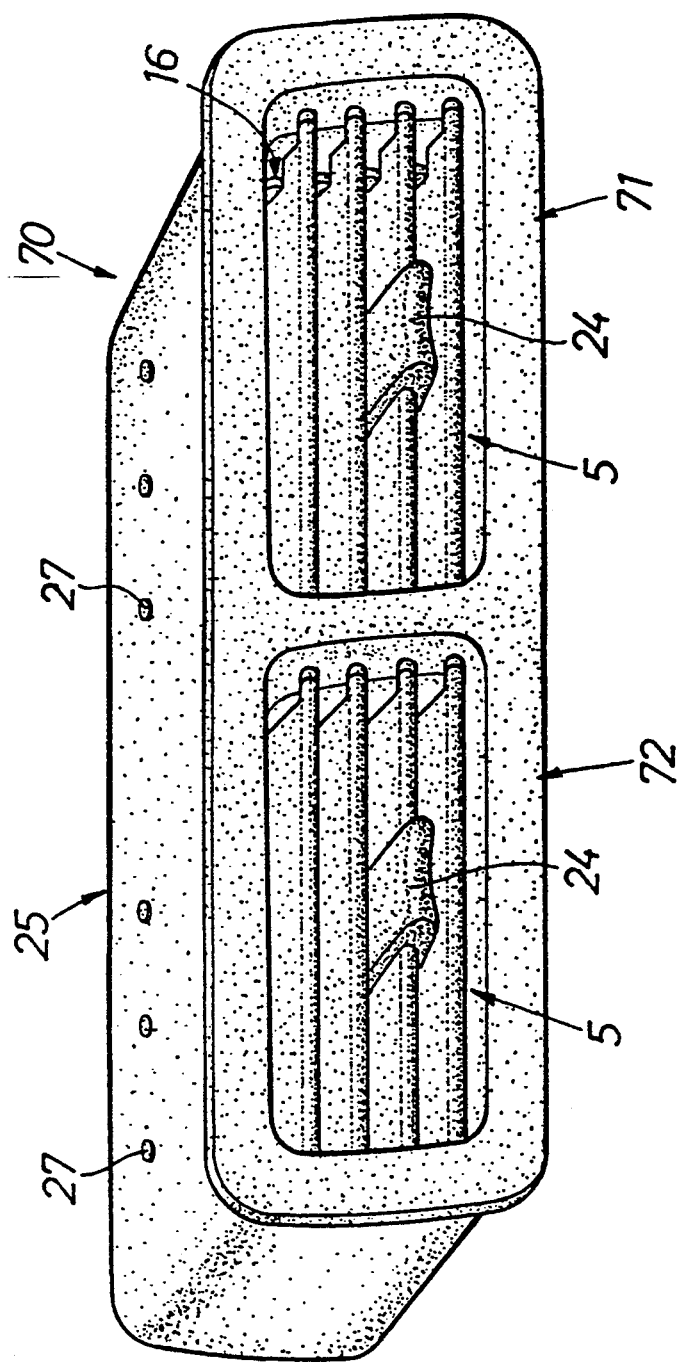
FIG. 18 is a perspective view illustrating another example of an air-conditioning blow-out port device.

FIG. 18 illustrates another example of an air-conditioning blow-out port device 70. This device 70 has a construction similar to the construction of the two blow-out port devices arranged laterally. The above-described two-stage injection molding process is also applicable to the molding of such a blow-out port device 70. In this case, a pivotally mounting portion 17 for an interlocking link 16 is provided at a right end of each of blades 5 in a right blow-out port structure 71, and at a left end of each of blades 5 in a left blow-out port structure 72.

What is claimed is:

1. A process for two-stage injection molding of an air-conditioning blow-out port device, said device comprising:

a housing of synthetic resin;

a plurality of blades of synthetic resin having a blade body disposed within the housing;

pairs of shaft bores provided in a coaxial arrangement in each pair, and being in opposed portions of a peripheral wall of the housing and extending through said opposed wall portions;

a pair of support shafts projectingly provided on opposite ends of the blade body and rotatably fitted in said shaft bores;

a pivotal mounting portion provided on each of said blades;

an interlocking link for interlockingly connecting the pivotal mounting portions of the blades, said pivotal mounting portion being comprised of a pivotal supporting shaft which is projectingly provided in parallel to said support shaft at a rear edge of an end of each blade body to extend through a pivotal supporting bore in said interlocking link, and a slip-off preventing projection raised outwardly from a rear side at a tip end of said pivotal supporting shaft to engage an edge of said pivotal supporting bore;

said process comprising the steps of:

closing a pair of opposed primary opening/closing dies and clamping between the primary opening/closing dies a plurality of first opposed slide dies which include a plurality of shaft bore forming cores, thereby defining a cavity for forming a housing in cooperation with the shaft bore forming cores;

primarily injecting synthetic resin into said cavity to mold said housing:

closing a pair of opposed secondary opening/closing dies and clamping said housing between said secondary opening/closing dies and a second slide die clamped between said secondary opening/closing dies and defining a plurality of blade body-forming cavities, while defining a plurality of pivotal supporting shaft-forming cavities between one of said secondary opening/closing dies and said second slide die, said pivotal supporting shaft-forming cavities communicating with a plurality of slip-off preventing projection-forming cavities provided in said one of the secondary opening/closing dies; and using said shaft bores in said molded housing as support shaft-forming cavities and secondarily injecting synthetic resin into said blade body-forming cavities, the support shaft-forming cavities, the pivotal supporting shaft-forming cavities and the slip-off preventing projection-forming cavities to mold the blades.

* * * * *